(12) United States Patent
Barr

(10) Patent No.: US 10,738,674 B2
(45) Date of Patent: Aug. 11, 2020

(54) WARM-UP OF A CATALYTIC AFTERTREATMENT DEVICE

(71) Applicant: Ford Global Technologies, LLC, Dearborn, MI (US)

(72) Inventor: William Gerald Barr, Chelmsford (GB)

(73) Assignee: Ford Global Technologies, LLC, Dearborn, MI (US)

( * ) Notice: Subject to any disclaimer, the term of this patent is extended or adjusted under 35 U.S.C. 154(b) by 190 days.

(21) Appl. No.: 15/709,305

(22) Filed: Sep. 19, 2017

(65) Prior Publication Data
US 2018/0087428 A1     Mar. 29, 2018

(30) Foreign Application Priority Data

Sep. 21, 2016  (GB) .................................. 1616050.9
Sep. 21, 2016  (IN) ............................. 201641032221
Sep. 23, 2016  (GB) .................................. 1616185.3

(51) Int. Cl.
*F01N 3/20*       (2006.01)
*F01N 9/00*       (2006.01)
*F01N 11/00*      (2006.01)

(52) U.S. Cl.
CPC .............. *F01N 3/2053* (2013.01); *F01N 9/00* (2013.01); *F01N 11/002* (2013.01);
(Continued)

(58) Field of Classification Search
CPC ............... F01N 3/2892; F01N 2240/20; F01N 2290/00; F16K 1/22; F16K 1/52;
(Continued)

(56) References Cited

U.S. PATENT DOCUMENTS 3,050,375 A    8/1962  Bloch
4,634,459 A    1/1987  Pischinger et al.
(Continued)

FOREIGN PATENT DOCUMENTS

CN    203403932 U    1/2014
DE      3738538 A1   5/1989
(Continued)

OTHER PUBLICATIONS

English Machine Translation of JP-57183511-A (Year: 1982).*
(Continued)

*Primary Examiner* — Anthony Ayala Delgado
(74) *Attorney, Agent, or Firm* — Geoffrey Brumbaugh; McCoy Russell LLP

(57) ABSTRACT

An apparatus and method for improving warm-up of a catalytic aftertreatment device is disclosed in which the flow to a catalyst brick is controlled using a flow control device so as to restrict the flow of exhaust gas to only a central core of the catalyst brick when rapid heating of the catalyst brick is desired to reach a light-off temperature and to otherwise allow the flow of exhaust gas to the entire front face of the catalyst brick. By restricting the area of the catalyst brick to which exhaust gas can flow the energy density of the exhaust gas flowing to the central core is higher than it is when there is no restriction of flow thereby reducing the time needed to warm-up the catalyst brick to a minimum light-off temperature.

20 Claims, 9 Drawing Sheets

(52) U.S. Cl.
CPC ...... *F01N 2260/14* (2013.01); *F01N 2390/00* (2013.01); *F01N 2410/06* (2013.01); *F01N 2900/1602* (2013.01); *Y02T 10/47* (2013.01)

(58) Field of Classification Search
CPC .......... F16K 47/08; E05D 15/063; E05F 1/16; Y10T 137/7898; Y10T 137/86759
See application file for complete search history.

(56) References Cited

U.S. PATENT DOCUMENTS

| | | | |
|---|---|---|---|
| 5,307,628 A | | 5/1994 | Castagne |
| 5,320,052 A | | 6/1994 | Spokoyny et al. |
| 2007/0283683 A1 | | 12/2007 | Bellinger |
| 2009/0165449 A1 | * | 7/2009 | Christ ................. F02B 37/013 60/320 |
| 2009/0183496 A1 | | 7/2009 | Arakawa et al. |
| 2011/0041482 A1 | | 2/2011 | Cheng et al. |
| 2013/0240059 A1 | | 9/2013 | Baumann |
| 2015/0101321 A1 | * | 4/2015 | Kuehnel ................ F01N 3/043 60/320 |
| 2016/0108787 A1 | * | 4/2016 | Ike ........................ F01N 9/005 60/288 |
| 2016/0138453 A1 | | 5/2016 | Jerger et al. |

FOREIGN PATENT DOCUMENTS

| | | | |
|---|---|---|---|
| DE | 102011085941 A1 | | 5/2013 |
| EP | 1990513 A1 | | 11/2008 |
| EP | 2647804 A1 | * | 10/2013 |
| GB | 615645 A | | 1/1949 |
| GB | 2533353 A | | 6/2016 |
| JP | 57183511 A | * | 11/1982 |
| JP | 2009007977 A | * | 1/2009 |
| KR | 19980038430 U | | 9/1998 |
| WO | 2008103109 A1 | | 8/2008 |

OTHER PUBLICATIONS

Intellectual Property Office of the United Kingdom, Combined Search and Examination Report Issued in Application No. GB1616050.9, dated Jan. 9, 2017, 9 pages.

Intellectual Property Office of the United Kingdom, Combined Search and Examination Report Issued in Application No. GB1616185.3, dated Feb. 23, 2017, 7 pages.

* cited by examiner

US 10,738,674 B2

WARM-UP OF A CATALYTIC AFTERTREATMENT DEVICE

CROSS REFERENCE TO RELATED APPLICATION

The present application claims priority to Great Britain Patent Application No. 1616050.9, filed Sep. 21, 2016, Indian Patent Application No. 201641032221, filed Sep. 21, 2016, and Great Britain Patent Application No. 1616185.3, filed Sep. 23, 2016. The entire contents of each of the above-referenced applications are hereby incorporated by reference in their entirety for all purposes.

FIELD

The present description relates generally to methods and systems for a motor vehicle having an internal combustion engine and in particular to a catalytic exhaust aftertreatment device of a motor vehicle having an engine supplying exhaust gas to the aftertreatment device.

BACKGROUND/SUMMARY

Exhaust gas emissions from internal combustion engines may be reduced through the use of exhaust aftertreatment devices such as catalytic converters located in the exhaust system.

The operating efficiency of a catalytic converter may be temperature dependent and a catalytic converter or, to be more precise, the catalyst brick forming the active part of the catalytic converter may reach a minimum temperature (light-up/off temperature) before effective conversion of the exhaust gases occurs. This minimum temperature may be equal to a temperature in a region of 350 to 400° C. There is therefore a finite time during which the catalyst temperature will be below this minimum temperature following a cold engine start during a warm-up period. During this warm-up period the exhaust gas hydrocarbon emissions out of the engine may be high and it may be desirable to heat the catalyst to its minimum efficient operating temperature (the light-off temperature) as quickly as possible.

Previous attempts to rapidly raise the temperature of a catalytic converter following a cold start may include supplying more fuel to the engine which can be by way of applying an additional load to the engine by, for example, recharging batteries or other energy storage devices which will also increase the temperature of the exhaust gas flowing from the engine or increasing the engine idle speed to an artificially high level. Another option to reduce the time needed to reach the light-off temperature is to directly inject fuel just prior to or directly into the aftertreatment device itself which combusts and thereby may increase the temperature within the aftertreatment device.

However, the inventors herein have recognized potential issues with such systems. As one example, the above heating operations include inefficient operating conditions because the fuel consumption of the vehicle will be high during this mode of operation and such approaches will result in an unacceptably high fuel penalty.

It is an object of this disclosure to minimize the time taken for a catalytic exhaust aftertreatment device to reach light-off during an engine warm-up period by rapid heating of the aftertreatment device while minimizing any associated fuel penalty.

In one example, the issues described above may be addressed by an emission control system having an electronic controller, an electrically controllable actuator operable in response to a control output from the electronic controller and a catalytic aftertreatment device connected to an exhaust outlet from an engine, the catalytic aftertreatment device comprising a housing defining an inlet flow passage, an outlet flow passage and a chamber in which is located a catalyst and a flow control device positioned upstream from the catalyst, the flow control device comprising inner and outer exhaust gas flow passages linking the inlet flow passage to the catalyst and a flow regulating means to selectively vary the flow of exhaust gas through the outer exhaust gas flow passage wherein the electrically controllable actuator is connected to the flow regulating means to limit the flow of exhaust gas flowing through the outer exhaust gas flow passage to speed up light-off of the catalytic aftertreatment device following a cold start up of the engine. In this way, a portion of the catalyst may be rapidly heated during the cold start up of the engine.

As one example, the flow regulating means may comprise one of a number of vanes and a number of flaps rotatable from a first position in which substantially no exhaust gas can flow through the outer exhaust gas flow passage to a second position in which there is substantially no restriction to the flow of exhaust gas through the outer exhaust gas flow passage. The outer gas flow passage may be an annular exhaust gas flow passage. The flow regulating means may comprise a number of vanes and the vanes may be spaced circumferentially around the annular exhaust gas flow passage. Each of the vanes may be arranged to rotate about a respective pivot axis that extends radially outwardly from a longitudinal axis of the catalytic aftertreatment device. The vanes may be linked together by a linkage mechanism so as to be moveable in unison between the first and second positions. The linkage mechanism may have an input member for connecting the linkage mechanism to a common actuator. The electronic controller may be arranged to move the vanes to the first position when it is desired to speed up light-off of the catalytic aftertreatment device and move the vanes to the second position when light-off has occurred. The system may further comprise at least one of an exhaust gas temperature sensor and an exhaust gas emission sensor to provide an indication to the electronic controller when light-off has occurred. The electrically controllable actuator may be connected to the input member of the linkage mechanism. According to a second aspect of the disclosure there is provided a motor vehicle having an emission control system constructed in accordance with said first aspect of the disclosure. According to a third aspect of the disclosure there is provided a method for reducing the time needed for a catalytic aftertreatment device forming part of an emission control system constructed in accordance with said first aspect of the disclosure that is connected to receive exhaust gas from an engine to reach a light-off temperature, wherein the method comprises establishing whether an engine start-up is a cold engine start up and if the start-up is a cold engine start-up using the electrically controllable actuator to control the flow regulating means to restrict the flow of exhaust gas through the outer flow passage so as to speed up light-off of the catalytic aftertreatment device.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
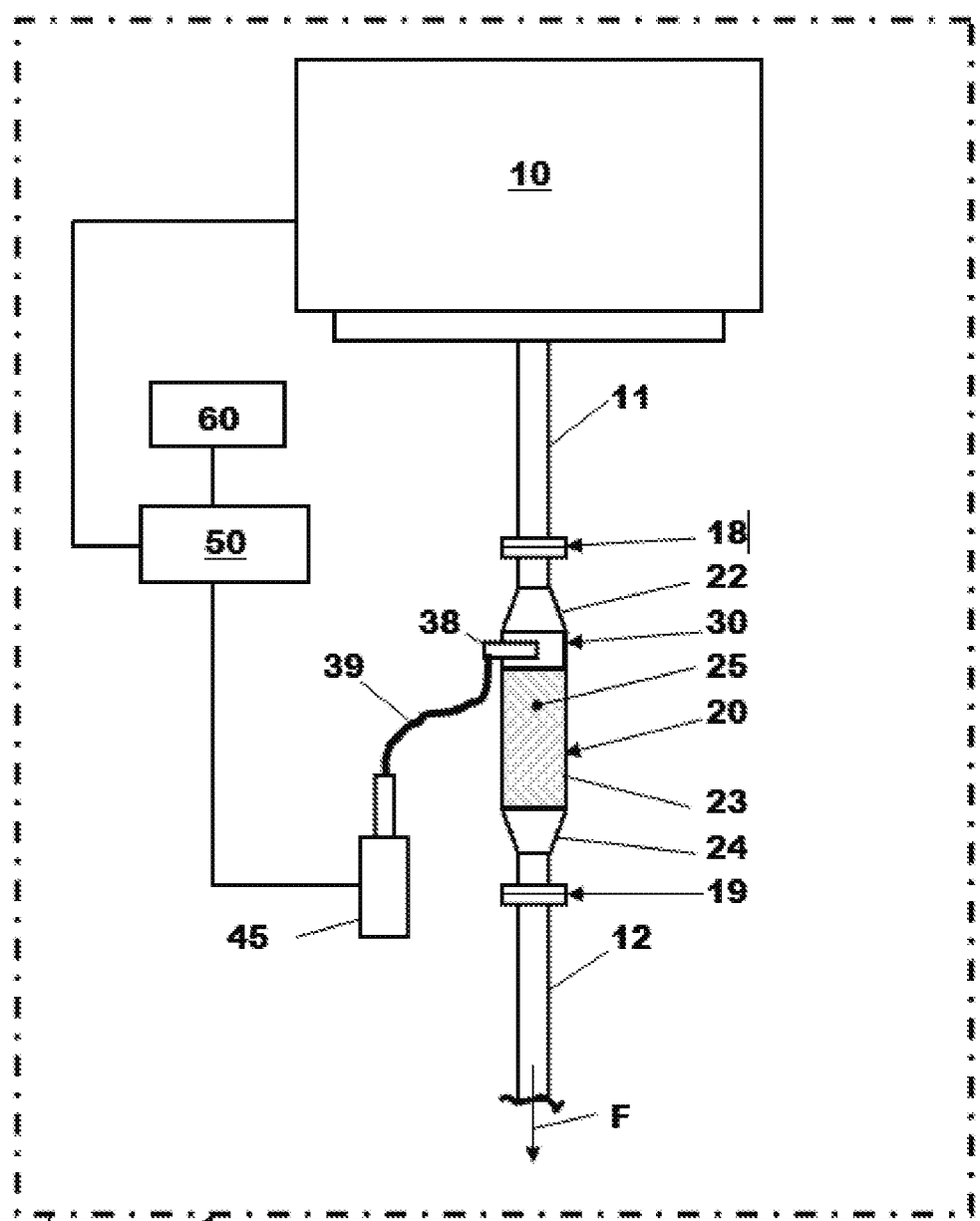
FIG. 1 is a schematic representation of a motor vehicle according to a second aspect of the disclosure having an emission control system in accordance with a first aspect of the disclosure engine that includes a catalytic aftertreatment device.
Figure 1:
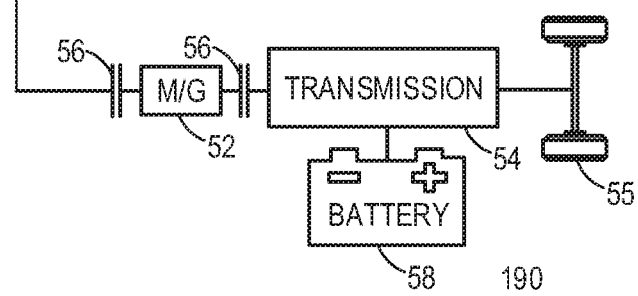
Figure 2:
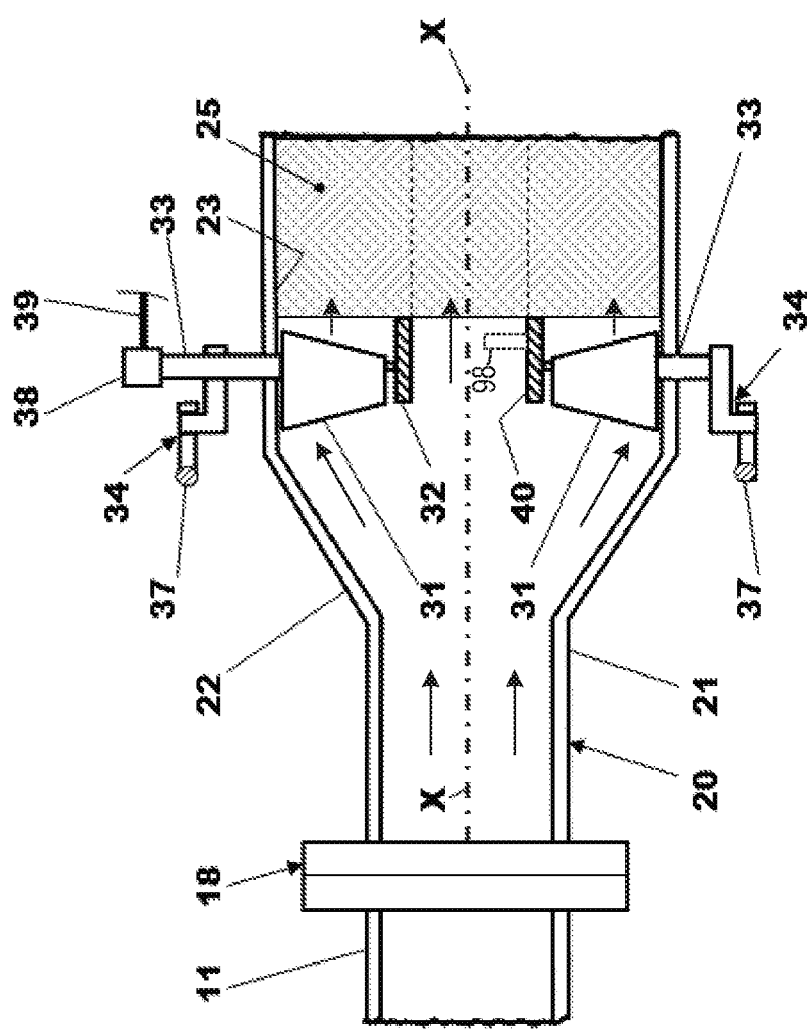
FIG. 2 is a cut-away side view of an inlet end of the catalytic aftertreatment device shown in FIG. 1 showing an exhaust gas flow control device according to one embodiment of the disclosure in a maximum exhaust gas flow state.
Figure 3:
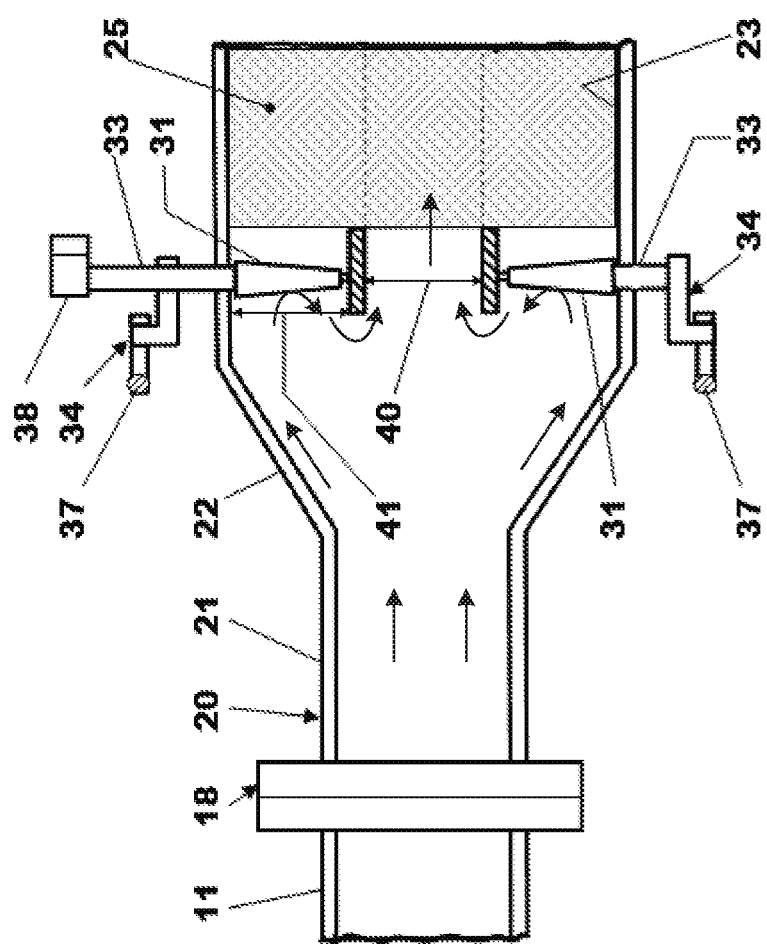
FIG. 3 is a view similar to FIG. 2 but showing the exhaust gas flow control device in a minimum exhaust gas flow state.
Figure 5:
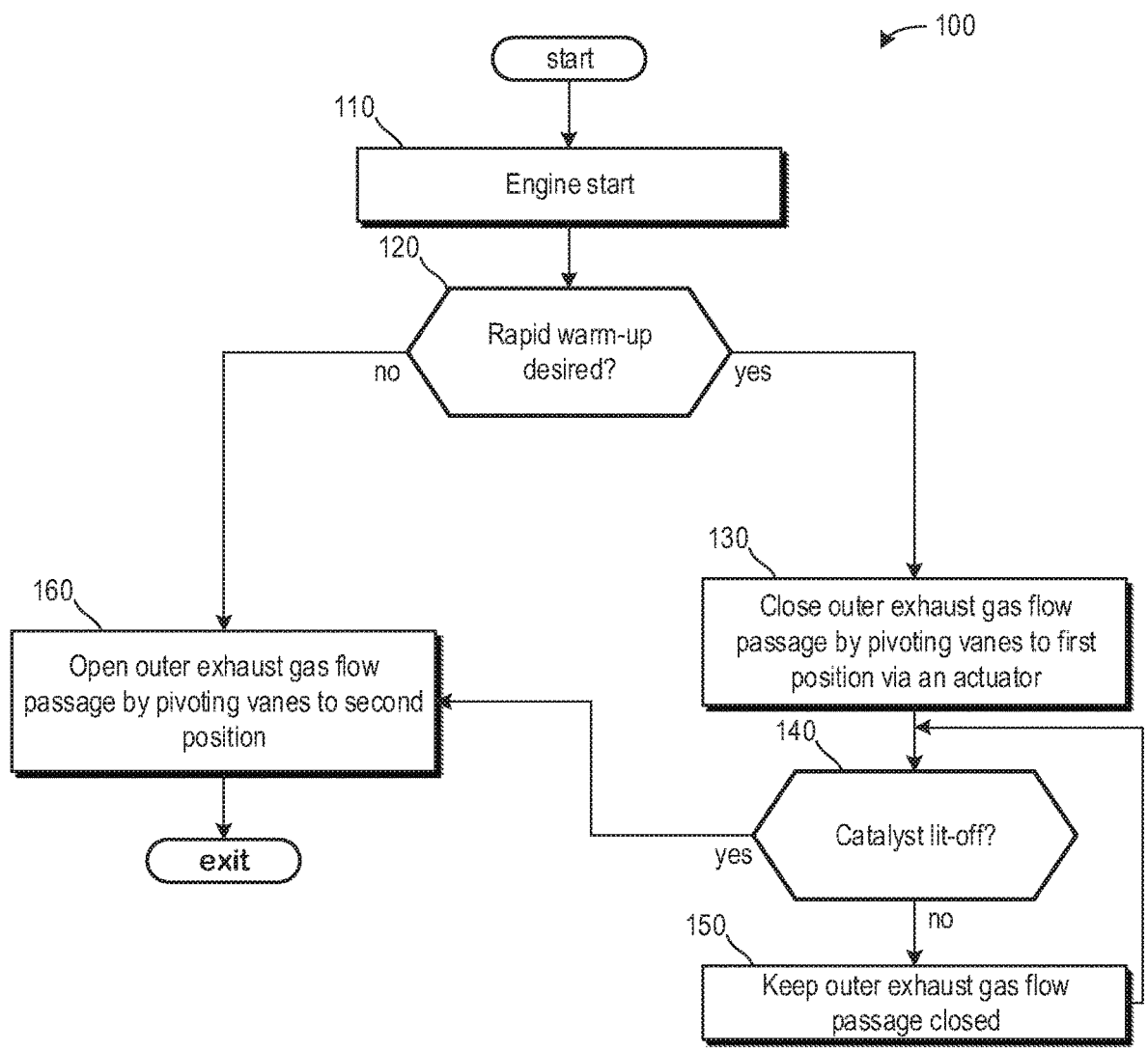
FIG. 5 is a high level flow chart of a method for reducing the time needed for a catalytic aftertreatment device to reach a light-off temperature in accordance with a third aspect of the disclosure.
Figure 6:
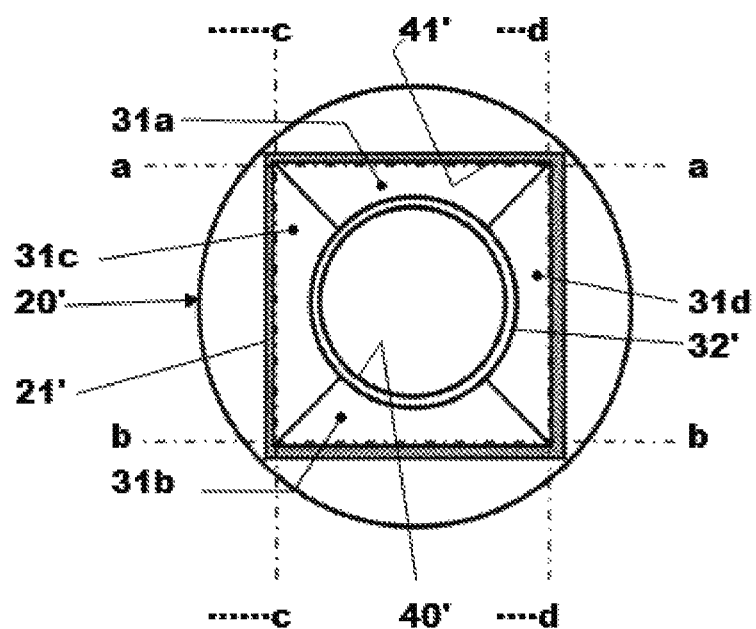
FIG. 6 is a view similar to FIG. 4 but showing an alternative embodiment of a flow control device.
Figure 7A:
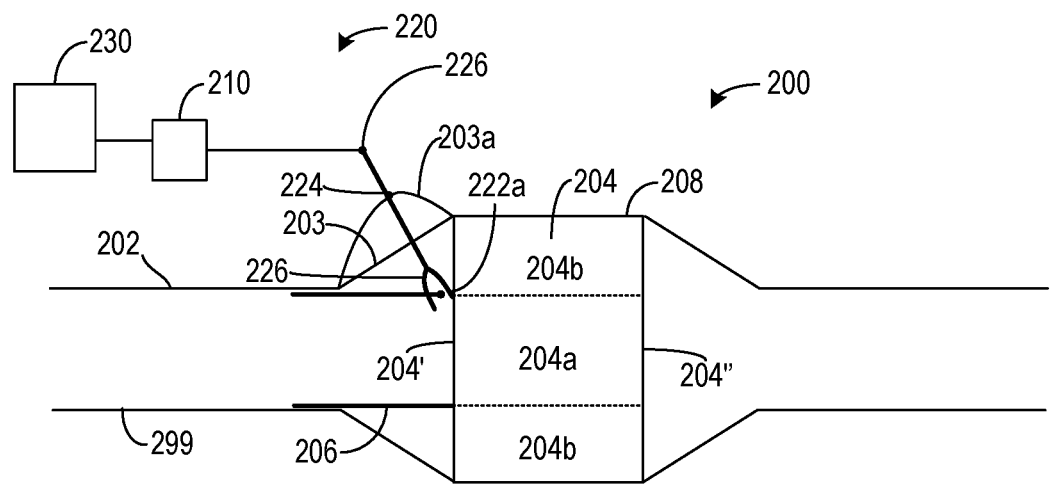
FIG. 7A is a schematic representation of an exhaust gas treatment assembly according to arrangements of the present disclosure, in a first configuration.
Figure 7B:
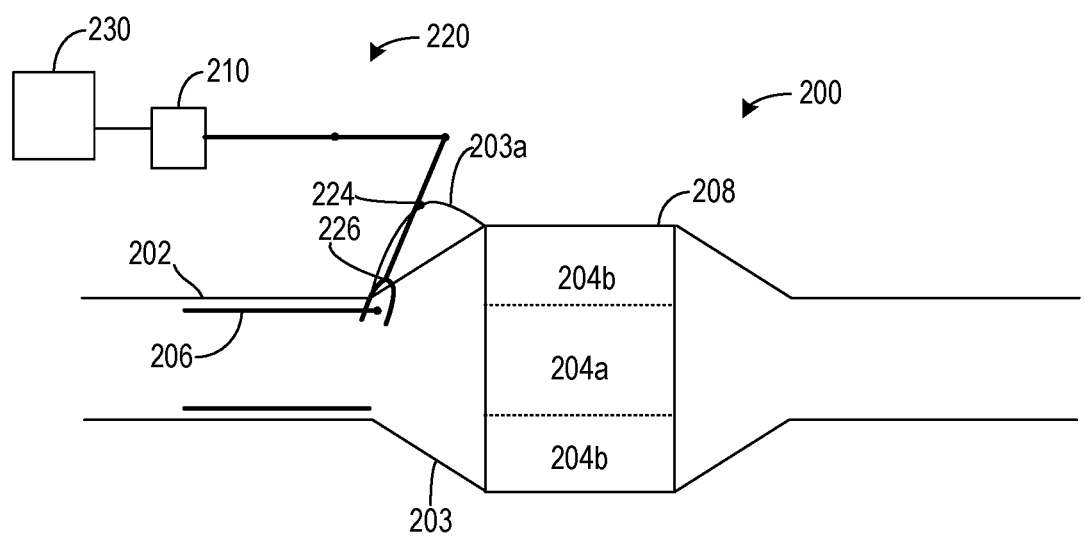
FIG. 7B is a schematic representation of the exhaust gas treatment assembly in a second configuration.
Figure 8:
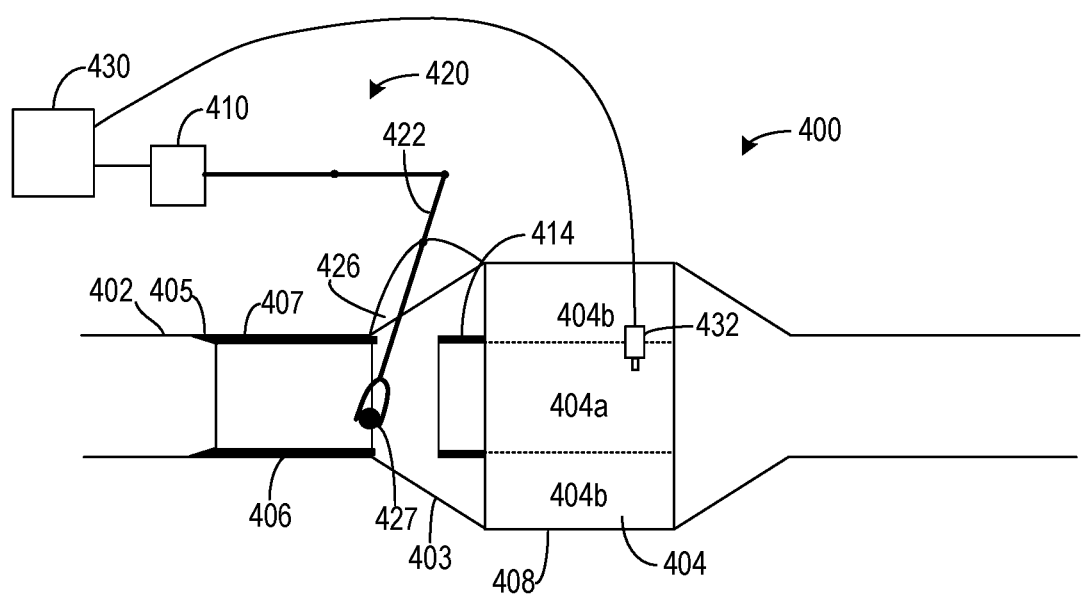
FIG. 8 is a schematic representation of an exhaust gas treatment assembly according to another arrangement of the present disclosure.
Figure 9:
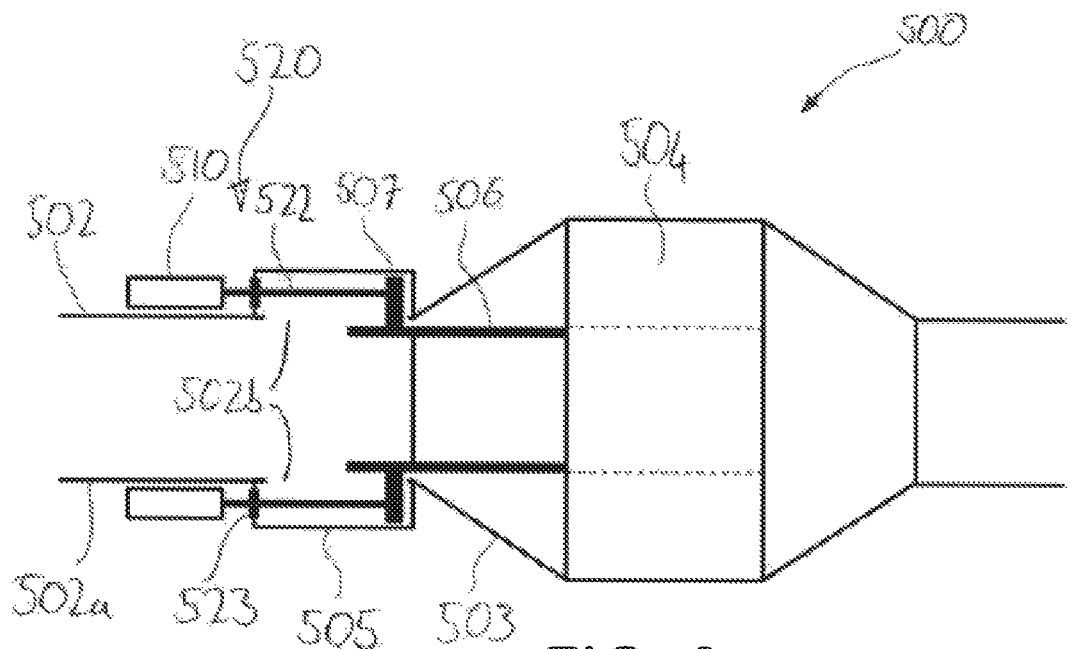
FIG. 9 is a schematic representation of an exhaust gas treatment assembly according to another arrangement of the present disclosure.
Figure 10:
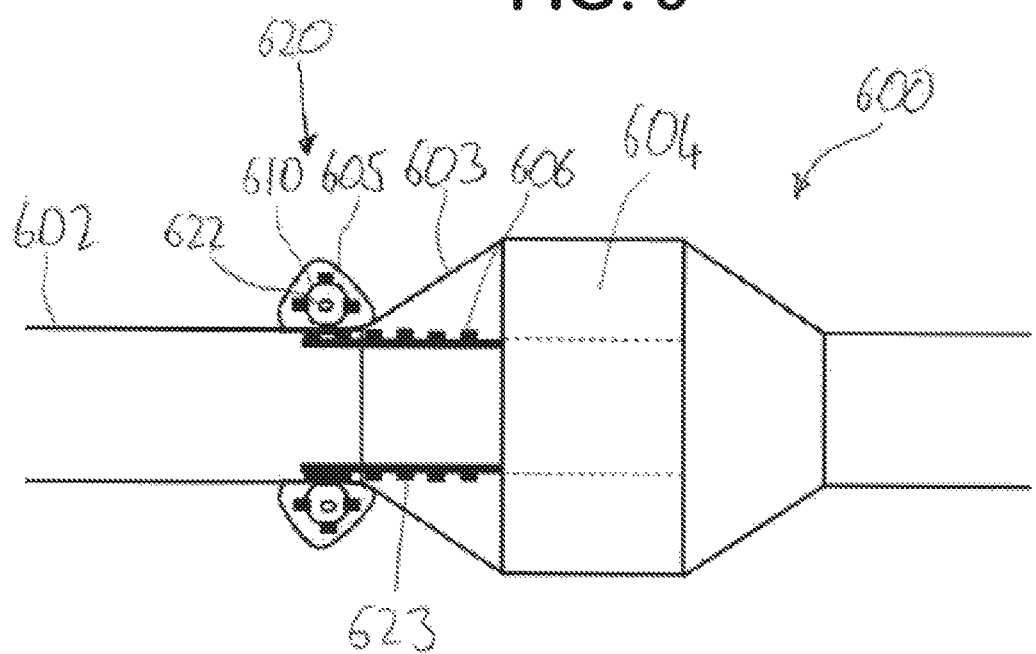
FIG. 10 is a schematic representation of an exhaust gas treatment assembly according to another arrangement of the present disclosure.

The following description relates to systems and methods for a flow control device of an exhaust gas aftertreatment device. An engine coupled to an electronic controller is shown in FIG. 1. The electronic controller comprises instructions stored on memory thereon that when executed enable the controller to rotate vanes of the flow control device to adjust exhaust gas flow toward the exhaust gas aftertreatment device. The vanes may be rotated to first and second positions, where the first position includes blocking a passage of exhaust gas to an outer region of the aftertreatment device and where the second position includes allowing exhaust gas to flow to the outer region of the aftertreatment device. FIG. 2 shows the vanes in the second position and FIG. 3 shows the vanes in the first position. Example exhaust gas flows are additionally depicted in FIGS. 2-3. A face-on view of a single vane of the flow control device is shown in the first position in FIG. 4. A method for adjusting the vanes based on at least a temperature of the aftertreatment device is shown in FIG. 5. An alternative embodiment of the flow control device is shown in FIG. 6. FIGS. 7A-7B show a second embodiment of the flow control device configured to be used via the method disclosed in FIG. 5. FIG. 8 shows a third embodiment of the flow control device. FIG. 9 shows a fourth embodiment of the flow control device. FIG. 10 shows a fifth embodiment of the flow control device.

FIGS. 2-4 and 7A-10 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

Note that FIGS. 2-3 show arrows indicating where there is space for gas to flow, and the solid lines of the device walls show where flow is blocked and communication is not possible due to the lack of fluidic communication created by the device walls spanning from one point to another. The walls create separation between regions, except for openings in the wall which allow for the described fluid communication.

With reference to FIGS. 1-3, there is shown a motor vehicle 5 having an internal combustion engine 10. The engine 10 may comprise an upstream exhaust pipe 11 to flow exhaust gas from the engine 10 to an exhaust gas catalytic aftertreatment device 20 which may include one or more of a NOx trap, particulate filter, HC trap, catalytic converter, three-way catalyst, diesel oxidation catalyst, selective catalytic reduction catalyst, lean NOx trap, slip catalyst, and the like. Herein, the aftertreatment device 20 is catalytic converter 20, however, other catalytic devices demanding rapid warm-up to reduce emissions have been contemplated herein (such as the aftertreatment devices mentioned above). The engine 10 may further comprise a downstream exhaust pipe 12 to flow exhaust gas from the catalytic converter 20 to atmosphere as indicated by the arrow 'F'. In this way, the catalytic converter 20 is arranged between the upstream exhaust pipe 11 and the downstream exhaust pipe 12.

In some examples, vehicle 5 may be a hybrid vehicle with multiple sources of torque available to one or more vehicle wheels 55. In other examples, vehicle 5 is a conventional vehicle with only an engine, or an electric vehicle with only electric machine(s). In the example shown, vehicle 5 includes engine 10 and an electric machine 52. Electric machine 52 may be a motor or a motor/generator. A crankshaft of engine 10 and electric machine 52 are connected via a transmission 54 to vehicle wheels 55 when one or more clutches 56 are engaged. In the depicted example, a first clutch 56 is provided between crankshaft and electric machine 52, and a second clutch 56 is provided between electric machine 52 and transmission 54. Controller 50 may send a signal to an actuator of each clutch 56 to engage or disengage the clutch, so as to connect or disconnect crankshaft from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from a traction battery 58 to provide torque to vehicle wheels 55. Electric machine 52 may also be operated as a generator to provide electrical power to charge battery 58, for example during a braking operation.

A flanged coupling 18 may fluidly couple the upstream exhaust pipe 11 to an inlet end of the catalytic converter 20 and a flanged coupling 19 is used to fluidly couple the downstream exhaust pipe 12 to an outlet end of the catalytic converter 20. Each of the flanged couplings 18 and 19 may substantially prevent exhaust gas from flowing to an ambient atmosphere outside of the upstream 11 and downstream 12 exhaust pipes, respectively.

As shown in FIGS. 2-3, the catalytic converter 20 has a housing 21 defining an inlet flow passage 22, an outlet flow passage 24 and a cylindrical chamber 23 in which is located a catalyst brick 25 and a flow control device 30 positioned upstream from the catalyst brick 25. The catalyst brick 25 may comprise a ceramic monolith having a ceramic structure coated with catalyst material. However, other structures may be used without departing from the scope of the present disclosure. The housing 21 may comprise of a material similar to the upstream 11 and downstream 12 exhaust pipes, respectively. The housing 21 may comprise a substantially circularly shaped cross-section along a longitudinal axis X-X.

The flow control device 30 comprises a tube 32 defining in combination with a wall of the housing 21 defining the chamber 23 inner and outer exhaust gas flow passages 40 and 41 and a flow regulating means in the form of a number of moveable flaps or vanes 31 located in the outer exhaust gas flow passage 41. In the case of this example the outer exhaust gas flow passage 41 is an annular flow passage due to the circular shape of the chamber 23 and the tube 32 when viewed in transverse cross-section.

The vanes 31 are spaced circumferentially around the annular exhaust gas flow passage 41 and each vane 31 is arranged to be rotatable about a respective pivot axis P-P (see FIG. 4) that in the case of this example extends radially outwardly from the longitudinal axis X-X (see FIG. 2) of the catalytic converter 20 by respective pivot pins 33.

Figure 4:
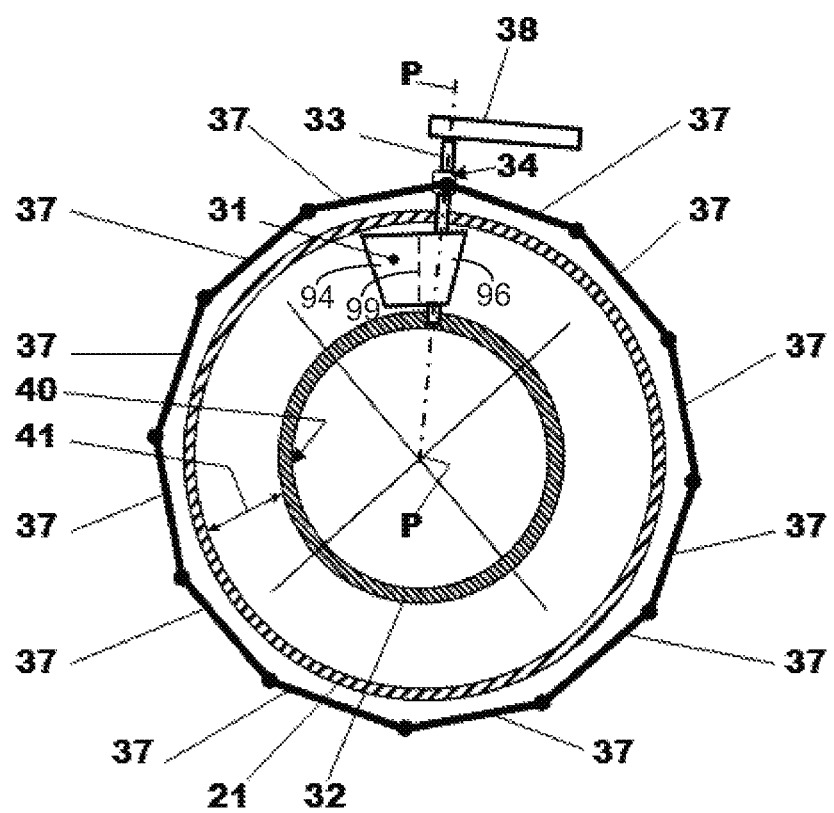
FIG. 4 is an end view of the catalytic converter showing part of an actuation mechanism for the flow control device and a single flap of a flow regulating means in the minimum exhaust gas flow state of FIG. 3.

As shown in FIG. 4, the vane 31 depicted comprises a central axis 99. The central axis 99 may be offset with the pivot axis P-P. By doing this, the vane 31 may be divided into two unequal sides (e.g., first side 94 and second side 96) relative to the pivot axis P-P. By doing this, the first side 94 may come into contact with a greater amount of exhaust gas relative to the second side 96. This may enable the vane 31 and any other vanes included in the flow control device 30 to pivot to an open position via exhaust gas flow. Thus, the vane 31 and any other vanes may be electrically pivoted to a closed position (e.g., the position shown in FIGS. 3-4) and electrically held in the closed position. Since the closed position may be desired during cold engine start conditions where a temperature of the catalytic converter 20 is less than a threshold temperature, it may be economically beneficial to allow exhaust gas flow to force the vane 31 and any other vanes of the flow control device 30 to the open position without electric assistance. Said another way, a duration of time needed to force the vane 31 and any other vanes in the closed position may be less than a duration of time needed to force the vane 31 in the open position. Thus, electrically actuating the vane 31 and any other vanes during the closed position may increase fuel economy relative to electrically actuating the vane 31 and any other vanes during the open position or both positions. The open and closed positions will be described in greater detail below.

FIG. 4 further shows a view from an inlet end of the catalytic converter 20 of a single vane 31 of a plurality of vanes, in a flow inhibiting rotational position corresponding to the position of the vanes 31 shown in FIG. 3 (e.g., the closed position).

The flow control device 30 forms part of an exhaust gas flow control apparatus that also includes a linkage mechanism comprising a number of link arms 34 interconnected by links 37, operated by a remote electrically controllable actuator in the form of an electrically controllable ram 45 via a cable drive 39 that is connected via an input member in the form of a lever 38 to an extended one of the pivot pins 33. The number of link arms 34 and link 37 may correspond to a number of vanes in the plurality of vanes.

The electrically controllable ram 45 is operable in response to a control output from an electronic controller 50 to rotate the vane 31. Because each vane 31 of the vanes is linked together by the link arms 34 and links 37 of the linkage mechanism, the vanes are moveable in unison between a first flow controlling position (e.g., closed position) in which substantially no exhaust gas can flow through the outer exhaust gas flow passage 41 (as shown in FIGS. 3-4) and a second flow controlling position (e.g., open position) in which there is substantially no restriction on the flow of exhaust gas through the outer exhaust gas flow passage 41 (as shown in FIG. 2).

In some examples, additionally or alternatively, each vane 31 of the vanes may be independently operated such that each vane 31 of the vanes is not linked by the link arms 34 and links 37. As such, the controller 50 may signal to each lever 38 of each vane 31 to rotate and/or pivot the vane 31 of the flow control device 30. In this way, some of the vanes may be adjusted to the closed position and the remaining vanes may be maintained in the open position. A number of vanes moved to the closed position may be adjusted based on a difference between the temperature of the catalytic converter and the threshold temperature. As an example, if a temperature of the catalytic converter is far less than the threshold temperature (e.g., 100° C. less than the threshold temperature), and then more of the vanes are moved to the closed position compared to a temperature of the catalytic converter being slightly less than the threshold temperature (e.g., 20° C. less than the threshold temperature).

That is to say, the vanes 31 are rotatable in unison about their respective pivot axes P-P from the first position to the second position depending upon whether there is a need to produce rapid light-off of the catalyst brick 25 as determined by the electronic controller 50. As described above, the electronic controller 50 may signal to an actuator (e.g., lever 38) of the vane 31 to pivot the vane 31 to the first flow controlling position if the vane 31 was originally in the second flow controlling position. Additionally or alternatively, the controller 50 may continue to signal to the actuator to maintain the vane 31 in the first flow controlling position against exhaust gas flow. If it is no longer desired to maintain the vane 31 in the first flow controlling position, (e.g., due to the catalytic converter being lit-off), then the controller 50 may no longer signal to or power the actuator of the vane 31 such that exhaust gas may pivot and hold the vane 31 in the second flow controlling position. This may be accomplished by the arrangement of the pivot axis P-P, allowing exhaust gas to press (e.g., apply pressure) unequally against the first 94 and second 96 sides.

In the first position, shown in FIGS. 3-4, the vane 31 (e.g., and any other vane 31) is arranged substantially at ninety degrees to the normal direction of flow of exhaust gas (shown by arrows) through the outer exhaust gas flow passage 41 and either lie such that one edge of one vane 31 rests upon an opposite edge of an adjacent vane 31 or the vanes 31 are positioned so that there is substantially no gap between the edges of adjacent vanes 31. This may result in the exhaust gas not flowing through the outer exhaust gas flow passage 41. In this way, when the vanes 31 are in the first position, the exhaust gas may flow to only an inner exhaust gas flow passage 40.

In the second position, shown in FIG. 2, the vanes 31 are arranged substantially in-line with the normal direction of flow of exhaust gas (shown via arrows) through the outer exhaust gas flow passage 41 and so have minimal effect on the flow of exhaust gas through the outer exhaust gas flow passage 41 to a front face of the catalyst brick 25. There may be a small angle of incidence between the direction of exhaust gas flow and each vane 31 in some cases but this will not significantly impede the flow of exhaust gas through the outer exhaust flow passage 41 but will induce swirl to the flow exiting the outer exhaust gas flow passage 41. In this way, exhaust gas flow through both the outer exhaust gas flow passage 41 and the inner exhaust gas flow passage 40.

The electronic controller 50 is connected to the engine 10 and is operable to control the air supply and fuelling of the engine 10. The electronic controller 50 is further arranged to receive a number of inputs from sensors shown as reference numeral 60 in FIG. 1, which are used to adjust the operation of the engine 10 and, in the case of this disclosure, also control the operation of the exhaust gas flow control apparatus.

The sensors 60 may include any sensor used by the electronic controller 50 to operate the engine 10 efficiently and control the operation of the exhaust gas flow apparatus such as, for example, an engine speed sensor, an inlet air mass flow sensor, an engine coolant temperature sensor, one or more exhaust gas emission sensors, intake mass air flow sensor, intake manifold pressure sensor, exhaust mass flow sensor, pedal position sensor, one or more exhaust gas temperature sensors, and the like.

An emission control system is comprised of the electronic controller 50, the flow control apparatus and the catalytic aftertreatment device in the form of the catalytic convertor 20.

During use the electronic controller 50 is arranged to receive a temperature input from a temperature sensor (not shown) forming one of the sensor inputs 60 that can be used to determine whether rapid warm-up of the catalytic converter 20 is demanded. This temperature sensor may measure the temperature of the catalytic converter 20 or may measure a temperature associated with the engine 10 such as for example a coolant temperature. In one example, the temperature sensor may be arranged in the catalytic converter 20. In another example, temperature sensors may be arranged in the upstream 11 and/or downstream 12 exhaust gas pipes and/or the housing 21. Additionally or alternatively, temperature sensors may be arranged in the outer exhaust flow passage 41 and/or the inner exhaust flow passage 40. An example arrangement of a temperature sensor 98, shown by a dashed box, included in the inner exhaust flow passage 40 is shown in FIG. 2. The temperature sensor(s) may be in communication with the controller 50 where feedback of the sensors may be indicative of a temperature of the engine and/or the catalytic converter 20. In one example, the temperature of the catalytic converter 20 is inferred based on a data stored in a look-up table. For example, the temperature sensor may measure an exhaust gas temperature directly upstream of the catalytic converter 20, where the exhaust gas temperature correlates to a temperature of the catalytic converter 20.

In one example, it will be appreciated that, if the engine 10 is below an ambient temperature, then it may be likely that rapid warm-up of the catalytic converter 20 will be desired but, if the engine 10 is at or close to its normal operating temperature, then it is likely that the catalytic converter 20 is also relatively hot and so rapid or enhanced warm-up of the catalytic converter 20 is not likely to be desired.

For example, in the case of an engine fitted with stop-start control (such as used in micro-hybrid and hybrid motor vehicles) in which the engine 10 will be frequently stopped and started in order to save fuel, it is not desirable to unnecessarily operate the exhaust gas flow control apparatus every time the engine 10 is restarted if the catalytic converter 20 is still hot. Such unnecessary operation is disadvantageous in that it will produce increased wear of the components forming the exhaust gas flow control apparatus and will likely produce unnecessary exhaust gas flow disturbances during the transition of the vanes 31 between their respective first and second positions.

Therefore, following start-up of the engine 10 the electronic controller 50 is operable to firstly determine from the temperature input received from the engine 10 or the catalytic converter 20 whether rapid warm-up of the catalytic converter 20 is desired.

If rapid warm-up of the catalytic converter 20 is not desired then the controller 50 is operable to use the electrically controllable ram 45 to move the vane 31 and any other vanes to their respective second positions or maintain them in their respective second positions and fuel the engine 10 normally so as to achieve maximum fuel economy and minimum emissions based upon the demand placed upon it.

If rapid warm-up of the catalytic converter 20 is demanded then the controller 50 is operable to use the electrically controllable ram 45 to move the vanes 31 to their respective first positions and fuel the engine 10 normally so as to achieve maximum fuel economy and minimum emissions based upon the demand placed upon it.

It is preferred if the electronic controller 50 is arranged to place or maintain the vanes 31 in their respective second positions whenever the engine 10 is shut-down to reduce the risk of undesirable exhaust gas flow disturbances when the engine 10 is restarted.

Therefore, whenever rapid warm-up of the catalytic converter 20 is desired, which may be following a start-up from cold, the vanes 31 are moved to their respective first positions thereby preventing or severely restricting the flow of exhaust gas through the outer exhaust gas flow passage 41. This has the effect of forcing substantially all of the exhaust gas to flow through the inner exhaust gas flow passage 40 thereby rapidly heating the core of the catalyst brick 25 due to the increased energy density of the exhaust gas flowing through the inner exhaust gas flow passage 40. This concentrated heating has the effect of reducing the time needed for the central core of the catalyst brick 25 to light-off and thereby shortens the time before the catalytic converter 20 can effectively reduce the tailpipe emissions from the motor vehicle 5 without additional fuel being supplied.

The light-off of the core of the catalyst brick 25 will, due to the reactions that occur within the catalyst brick 25 after light-off, cause heat to be generated that will spread radially outwardly thereby rapidly heating the outer parts of the catalyst brick 25.

Said another way, the FIGS. 1-4 depict the engine 10 being fluidly connected to the aftertreatment device 20 via the upstream exhaust pipe 11. The aftertreatment device 20 may comprise the inlet flow passage 22 allowing exhaust gas to flow further away from the longitudinal axis X-X relative to the upstream exhaust pipe 11. This may include flowing exhaust gas to the inner exhaust flow passage 40 and the outer exhaust flow passage 41. The inner exhaust flow passage 40 is aligned with the longitudinal axis X-X. The outer exhaust flow passage 41 is concentric with the inner exhaust flow passage 40 relative to the longitudinal axis X-X. In this way, the outer exhaust flow passage 41 is located radially outside of the inner exhaust flow passage 40. The inlet flow passage 22 may direct exhaust gas to both the outer exhaust flow passage 41 and the inner exhaust flow passage 40.

The inner exhaust flow passage 40 may be fluidly separated from the outer exhaust flow passage 41. In one example, a tube 32 extending from the aftertreatment device 20 fluidly separates the inner exhaust flow passage 40 from the outer exhaust flow passage 41. The tube 32 may comprise of aluminium, plastic, copper, iron, ceramic, or the like. Additionally or alternatively, a substrate of the aftertreatment device 20 may protrude from the aftertreatment device 20 cylindrically, similar to the tube 32 shown in FIG. 2. At any rate, the flow control device 30 comprises at least a vane 31 which may extend from the tube 32 to an inner surface of the inlet flow passage 22. In one example, the vane 31 is configured to pivot about an axis p-p, which is perpendicular to the longitudinal axis x-x.

The vane 31 may be a single vane of a plurality of vanes, each vane being substantially identical. The vane 31 and any other vanes included in the flow control device 30 may be substantially trapezoidal in shape. Additionally or alternatively, the vane 31 may be contoured and/or curved to follow a shape of the tube 32 and the inlet flow passage 22.

The vanes may move between first and second positions, where the first position may correspond to a closed position and the second position may correspond to an open position. In the first position, the vanes are pivoted such that a plane of the vanes is perpendicular to a direction of exhaust gas flow, which may be parallel to the longitudinal axis X-X. As such, exhaust gas may collide with a surface of the vane 31 of the vanes and not flow into the outer exhaust flow passage 41. In this way, the first position may allow exhaust gases to enter the aftertreatment device 20 via only the inner exhaust flow passage 40.

In the second position, the vanes are pivoted such that a plane of the vanes is parallel to the direction of exhaust gas flow. As such, a majority of exhaust gas may freely flow between the vanes and through the outer exhaust flow passage 41. In this way, exhaust gas may enter the aftertreatment device 20 via both the inner exhaust flow passage 40 and the outer exhaust flow passage 41.

In one example, the vanes are pivoted based on instructions from the controller 50 to the lever 38 of the flow control device 30. The lever 38 being configured to pivot the vanes between the first and second positions, the first and second positions differing from one another by 90 degrees. As such, a pivot range of the vane 31 and any other vane may be between 0 to 90°.

The vane 31 is rotated about the pivot axis P-P which is arranged offset to and/or misaligned with the central axis 99 of the vane 31. It will be appreciated that any other vanes included in the flow control device 30 may also include a pivot axis P-P offset with their central axes similarly to relation shown in FIG. 4. As such, the vane 31 may be unevenly divided relative to the pivot axis P-P such that the first side 94 and the second side 96 experience different exhaust gas pressures. In this way, exhaust gas may force the vane 31 to the second position and/or open position. Thus, the controller 50 powers and/or signals to an electric actuator to pivot the vane 31 and any other vane to actuate to the first position and/or closed position. The electric actuator is powered until the first position and/or closed position is no longer desired (e.g., in response to a temperature of the aftertreatment device 20 exceeding the threshold temperature).

With reference to FIG. 5 there is shown a method 100 for reducing the time needed for a catalytic aftertreatment device to reach a light-off temperature according to the disclosure. Instructions for carrying out method 100 may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

The method 100 begins at 110, which includes a key-on engine start. This may include a key turning in a vehicle ignition, a button being depressed, and the like. The method 100 then may advance to box 120 where it is determined whether rapid warm-up of a catalytic aftertreatment device such as the catalytic converter is desired. As previously referred to, this can be determined via a direct measurement of the temperature of the catalytic converter using a temperature sensor associated with the catalytic converter or be a measurement of the temperature of the engine from, for example, one of an engine coolant temperature sensor, engine cylinder block temperature sensor or an engine oil temperature sensor.

Rapid warm-up may be desired when a cold engine start is occurring. The engine cold-start is occurring when the engine temperature is less than a threshold temperature, where the threshold temperature is based on an ambient temperature.

If it is determined that rapid warm-up of the catalytic converter is desired then the method 100 may advance from box 120 to box 130 where the flow of exhaust gas to the outer peripheral region of the catalyst brick of the catalytic converter is regulated by preventing or severely restricting the flow of exhaust gas through the outer exhaust gas flow passage so as to cause substantially all of the exhaust gas from the engine to flow through the inner exhaust gas flow passage thereby rapidly heating the core of the catalyst brick. This may be accomplished by pivoting the vanes to the second position, where the vanes are perpendicular to a direction of exhaust gas flow.

Adjusting the vanes to the first position may include activating one or more actuators (e.g., the lever 38 of FIG. 4) to pivot the vanes from the second position to the first position. In one example, the vanes are naturally held (e.g., without electric assistance) in the second position and pivot to the first position via electric assistance based on instructions from the controller (e.g., controller 50 of FIG. 1). The electric assistance may continue for the entire duration the vanes are held in the first position. Thus, the vanes may pivot back to the second position when the electric assistance is terminated as will be described below.

The method 100 then advances to step 140 where it is checked whether light-off of the catalytic converter has occurred. This can be inferred from measuring the temperature of the catalytic converter or be based upon a measurement of the emissions downstream from the catalytic converter using a suitable emission sensor such as, for example, a NOx sensor. In one example, an exhaust gas sensor is arranged in the downstream exhaust pipe and protrudes into a portion of the downstream exhaust pipe directly downstream of the a portion of the catalytic converter corresponding to the inner exhaust gas flow passage (e.g., inner exhaust gas flow passage 40).

As an example, if the NOx sensor detects an amount of NOx less than a threshold NOx amount, then the catalyst may be lit-off. As such, the threshold NOx amount may be based on a non-zero, positive value based on a NOx amount flowing out of the catalyst when the catalyst is lit-off. In one example, the NOx amount flowing out of the catalyst when the catalyst is lit-off is less than the NOx amount flowing out of the catalyst when the catalyst is not lit-off. Additionally or alternatively, the catalyst is determined via a temperature sensor. For example, feedback from the temperature sensor (e.g., temperature sensor 98 of FIG. 2), may correlate with values stored in a look-up table. If the temperature sensed by the sensor exceeds a threshold temperature (e.g., ambient temperature or catalyst light-off temperature), then the catalyst may be lit-off.

If the check carried out in box 140 establishes that the catalytic converter 20 has not lit-up (the temperature is below the light-off temperature) then the method 100 advances to box 150 and the flow of exhaust gas through the catalytic converter is maintained in the restricted single passage mode thereby ensuring that substantially all of the exhaust gas exiting the engine flows to and heats the core of the catalyst brick.

The method 100 then returns to box 140 to re-check whether the catalytic converter has lit-up and, if it has not, returns to box 150 and will continue to cycle through boxes 140 and 150 until eventually the check in box 140 confirms that light-off of the catalytic converter has occurred at which point the method 100 advances from box 140 to box 160.

In box 160 the flow of exhaust gas through the catalytic converter 20 is arranged to be substantially unrestricted and so exhaust gas can flow freely through both the inner and the outer exhaust gas flow passages and. Because the flow through the outer gas flow passage has previously been restricted then this will demand the opening of the flow control device by moving the vanes to their respective second positions.

In one example, actuating the vanes from the first position to the second position includes deactivating the actuator of the vanes. In this way, exhaust gas may force the vanes to the second position and hold the vanes in the second position without electric assistance. This may reduce fuel consumption.

If when checked in box 120 enhanced or rapid warm-up of the catalytic converter is not desired, the method 100 will advance from box 120 directly to box 160.

In box 160 the flow of exhaust gas through the catalytic converter is arranged to be substantially unrestricted and so exhaust gas can flow freely through both the inner and the outer exhaust gas flow passages and. If the flow through the outer gas flow passage has previously been unrestricted then this will desire no change to the operating mode of the flow control device but if the flow through the outer gas flow passage has previously been restricted then this will demand the opening of the flow control device by pivoting the vanes to their respective second positions.

It will be appreciated that if at any time there is a key-off event then the method 100 will end and will be restarted when the next key-on event occurs.

It will be appreciated that because this method operates by increasing the energy density acting on the core of the catalyst brick no significant extra fueling of the engine is desired and so the catalytic converter is lit-up rapidly without incurring any significant fuel penalty.

Although the disclosure has been described with respect to a specific embodiment using a number of rotatable circumferentially spaced vanes it will be appreciated that other flow controlling devices able to limit the flow through the outer flow passage such as flaps could be used and that the disclosure is not limited to the use of circumferentially spaced vanes.

FIG. 6 shows in a diagrammatic form how the flow regulating means previously described can use four flaps 31*a*, 31*b*, 31*c* and 31*d* instead of the vanes 31 previously described. The catalytic converter 20' is intended to be a direct replacement for the catalytic converter shown in FIGS. 1-4 and operates in a similar manner to provide rapid warm-up of the catalytic converter when desired.

The flap 31*a* is rotatable about a pivot axis a-a, the flap 31*b* is rotatable about a pivot axis b-b, the flap 31*c* is rotatable about a pivot axis c-c and the flap 31*d* is rotatable about a pivot axis d-d, the actuation means for rotating the flaps 31*a* to 31*d* is not shown but would be electronically controlled in a similar manner to that previously described. At any rate, exhaust gas may force the flaps 31*a*, 31*b*, 31*c*, and 31*d* to the first position unless the controller 50 signals to an actuator, which may be electrically, mechanically, pneumatically, and/or hydraulically powered to force the flaps to the second position.

As before an inner exhaust gas flow passage 40' is defined by a tube 32' and an outer flow passage 41' is defined by the combination of the tube 32' and a wall of a housing 21' of the catalytic converter 20'.

As before the flaps 31*a* to 31*d* are rotatable in unison from a first position as shown in FIG. 6 in which the flow of exhaust gas through the outer exhaust gas flow passage 41' is prevented so that substantially no exhaust gas can flow therethrough to a second position substantially at ninety degrees to the first position where there is substantially no restriction to the flow of exhaust gas through the outer exhaust gas flow passage 41'. As before the flow of exhaust gas through the inner exhaust gas flow passage 40' may not be restricted.

Although the catalytic aftertreatment device as referred to above is a catalytic converter it will be appreciated that the disclosure is also applicable to the rapid warm-up other types of exhaust catalytic aftertreatment device that have to be heated to a minimum temperature quickly during a warm-up period in order to function efficiently.

With reference to FIGS. 7A-7B, an embodiment 200 of the flow control device (e.g., flow control device 30 of FIGS. 1-4) is shown. The embodiment 200 comprises a duct 202 configured to carry exhaust gas from the exhaust pipe 299 to a catalyst 204. The embodiment 200 may be used with the engine 10 and the controller 50 of FIG. 1. In one example, the catalyst 204 is substantially identical to the aftertreatment device 20 of FIG. 1.

The catalyst 204 may be configured to increase the rate of a reaction of the exhaust gases within the embodiment 200. The reaction of the exhaust gases within embodiment 200 may lead to a reduction in the quantities of polluting substances present within the exhaust gases. Additionally or alternatively, the catalyst 204 may be configured to react, e.g. directly react, with one or more of the polluting substances within the exhaust gases, in order to capture the substances within embodiment 200.

The efficiency with which the catalyst 204 reacts with the exhaust gases and/or increases the rate of a reaction of the exhaust gases may depend on the temperature of the catalyst 204. In some arrangements, the catalyst 204 may not begin to react with and/or catalyze the reaction of the exhaust gases until the catalyst has been heated to a "light off" temperature of the catalyst.

When the engine 10 begins operating, the catalyst 204 may be cold, and hence, the exhaust treatment assembly may not operate efficiency. However, during operation of the engine 10, hot exhaust gases leaving the engine 10 may flow through embodiment 200 and may heat the catalyst 204 to a temperature at which it begins operating effectively.

In some arrangements of the disclosure, the catalyst 204 comprise a substrate, e.g. a metal substrate, provided with a catalytic material on one or more surfaces of the substrate. For example, a wash coat containing the catalytic material may be applied to the substrate and may form a coating on the surface of the substrate. The substrate and/or the catalytic material may be configured to provide a high surface area at which reactions of the exhaust gases may take place in the presence of the catalyst. For example, the substrate may form a lattice, such as a honeycomb lattice.

As depicted in FIGS. 7A-7B, the catalyst 204 may comprise a first portion 204a and a second portion 204b. The first portion 204a of the catalyst may be a central portion of the catalyst and the second portion 204b may be provided radially outside of the first portion 204a. In the arrangement depicted, the first portion 204a is substantially the same diameter as the duct 202. However, it is equally envisaged that the first portion 204a may have a smaller or larger diameter.

As shown, at least part of the second portion 204b is provided radially outside of the duct 202 and/or the exhaust pipe 19. In other words, the catalyst 204 may provide a larger cross-sectional flow area for the exhaust gases than the duct 202 or the exhaust pipe 19.

In order to encourage exhaust gases flowing through the duct 202 to flow through the total cross-sectional flow area of the catalyst 204, the exhaust treatment assembly may further comprise a diffuser 203 provided between the duct 202 and the catalyst. As the flow of exhaust gases passes through the diffuser 203 the cross-sectional flow area of the diffuser changes, e.g. increases, to become substantially equal to or greater than the flow area of the catalyst 204. As depicted in FIGS. 7A-7B, the diffuser 203 may form a portion of a cone. However, it is equally envisaged that the diffuser 203 may form any other suitable shape. Although the diffuser 203 has been described as a separate component to the duct 202, it is equally envisaged that the diffuser 203 may be a portion of the duct 202 along which the flow area of the duct increases.

The catalyst, e.g. the substrate of the catalyst, may be configured to define one or more channels extending from a front end 204' of the catalyst to a rear end 204" of the catalyst. For example, the first portion 204a may comprise one or more first channels, and the second portion 204b may comprise one or more second channels arranged about the first channels. The first and second channels may be open at the front and rear ends of the catalyst to allow exhaust gases to enter the channels and flow through the catalyst. The channels may be configured to allow exhaust gases to pass between the channels, as the exhaust gas flows through the catalyst. Alternatively, the channels may be configured such that exhaust gases are contained within the channels as the exhaust gases flow through the catalyst and are prevented from passing between the channels.

As depicted in FIGS. 7A-7B, the first and second portions 204a, 204b of the catalyst may be separated by a barrier 204c. The barrier 206c may be configured to prevent exhaust gases passing between the first and second portions 204a, 204b of the catalyst, e.g. between the channels formed in the first and second portions respectively. Alternatively, the barrier 204c may be permeable and may allow exhaust gases to pass between the first and second portions.

Embodiment 200 may comprise a housing 208 and the catalyst, e.g. the substrate on which the catalytic material is provided, may be provided within the housing 208. The catalyst 204 may be mounted to the housing. However in other arrangements, the housing 208 may be integral with the catalyst 208. For example, the housing 208 may be provided by an outer wall of the catalyst substrate.

Embodiment 200 further comprises a movable element 206 configured to guide exhaust gases from the duct 202 to the catalyst 204. The movable element 206 may be movable between a first position, as depicted in FIG. 7A, in which the movable element 206 acts to direct exhaust gases into the first portion of the catalyst 204a and a second position, as depicted in FIG. 7B, in which the movable element is arranged such that exhaust gases are encouraged to flow into the second portion of the catalyst 204b, e.g. in addition to the first portion 204a.

The movable element 206 may be provided within the duct 202. As depicted in FIGS. 7A, 7B, and 8, the movable element may be configured to be at least partially received within the duct 202. In some arrangements, when the movable element 206 is in the second position the movable element may be substantially completely received within the duct 202, such that the cross-sectional flow area of the exhaust gases is encouraged to expand over the length of the diffuser 203, as described above, in order to flow into the catalyst over substantially the total cross-section area of the catalyst 204.

In the arrangement depicted, the movable element 206 comprises a tube disposed within the duct 202 and configured to slide into and out of the duct. When the movable element 206 is in the first position, e.g. an extended position, as shown in FIG. 7A, the tube may extend between the duct 202 and the catalyst 204 and may direct exhaust gases from the duct 202 into the first portion 204a of the catalyst 204. Furthermore, when the movable element 206 is in the first position, the exhaust gases may flow within the tube of the movable element when passing through the diffuser 203, and hence, the flow area of the exhaust gases may be discouraged or prevented from expanding such that the exhaust gases flow into the second portion 204b of the catalyst.

As shown in FIG. 7B, when the movable element 206 comprises the tube, when the movable element 206 is in the second position, e.g. a retracted position, the tube may be substantially completely received within the duct 202 and may not prevent the flow of exhaust gases from expanding within the diffuser to flow into the second portion 204b of the catalyst.

When the engine 10 begins operating and the catalyst 204 is cold, the catalyst may not operate effectively. By controlling the position of the movable element 206 it is possible to control the flow of exhaust gases, such that the exhaust gases flow through a sub-portion of the catalyst, e.g. through the first portion only. A smaller portion of the catalyst 204 is exposed initially to the hot exhaust gases leaving the engine. This increases the rate at which the portion of the catalyst is heated to a suitable temperate to begin operating effectively. By heating a sub-portion of the catalyst 204 to a desired operating temperature, the overall efficiency of the catalyst 204 may be increased compared to if the whole of the catalyst was heated to a lower temperature.

Once the first portion 204a of the catalyst has been heated to a desirable temperature, the position of the movable element 206 may be controlled, e.g. the movable element may be moved into the second position, to allow exhaust gases to flow through the second portion 204b of the catalyst 204 and heat the second portion to the desired operating temperature.

Embodiment 200 may further comprise an actuator 210 configured to control the position of the movable element 206 by virtue of a control linkage 220. As depicted in FIGS. 7A-7B, the control linkage 220 may comprise a control rod 222 coupled to diffuser 203 at a pivot 224. As depicted, the diffuser 203 may comprise a boss or extension 203a configured to support the pivot 224. A gas seal 223 may be provided between the extension 203a of the diffuser and the control rod 222, e.g. at or adjacent to the pivot 224, to prevent exhaust gases leaking out of the diffuser around the control rod 222.

The control rod 222 may have a first end 222a and a second end 222b. A connector 226, such as a clevis or yoke, may be provided at the first end 222a. The connector 226 may be coupled to the movable element 206. For example, the connector may be coupled to a corresponding connector, a pin, a slot or any other suitable feature provided on the movable element 206. The actuator 210 may be configured to act against the second end 222b of the control rod 222 to pivot the control rod 222 about the pivot 224 and thereby adjust the position of the movable element 206.

The actuator 210 may be hydraulically, pneumatically or electrically powered. A controller 230 may be configured to control the operation of the actuator. The controller 230 may be a powertrain control module or body control module of the vehicle. Alternatively, the controller 230 may be any other controller of the vehicle or may be a dedicated controller provided within embodiment 200. In one example, the controller 230 is substantially identical to controller 50 of FIG. 1.

With reference to FIG. 8, an embodiment 400 according to another arrangement of the present disclosure will now be described. The embodiment 400 may be used with the engine 10 and controller 50 of FIG. 1. The embodiment 400 comprises a duct 402 and a diffuser 403, which are similar to the duct 202 and diffuser 203 shown in FIGS. 7A-7B. The embodiment 400 also comprises a catalyst 404, a movable element 406 and a housing 408, which are similar to the catalyst 204 the movable element 206 and the housing 208 respectively. Additionally or alternatively, the catalyst 404 may be used similarly to aftertreatment device 20.

As mentioned above, the exhaust gas assembly 400 may further comprise a temperature sensor 432 configured to allow a temperature of the catalyst, e.g. the first portion 404a of the catalyst to be determined. The temperature sensor 432 may be coupled to a controller (e.g., controller 50).

As depicted in FIG. 8, the movable element 406, e.g. an outer diameter of the movable element, may be configured such that a gap 407 is formed between the movable element 406 and the duct 402, e.g. when the movable element is at least partially received within the duct, this may reduce the likelihood of the movable element 406 becoming lodged in the duct 402, for example as the relative temperatures of the movable element 406 and the duct 402 vary and the movable element and the duct expand and contract due to the changing temperatures. However, during operation of the engine assembly 100, particles present in the exhaust gases may flow into the gap. The particles may become stuck in the gap and may act to bind the movable element 406 in the duct 402.

In order to reduce to amount of particles entering and building up within the gap 407, the embodiment 400 may comprise a flow guide 405 provided within the duct 402 and configured to discourage the exhaust gases from flowing into the gap. For example, as shown in FIG. 8, the flow guide 405 may be configured to direct the exhaust gases towards the center of the duct 402 and away from the gap. As depicted in FIG. 8, the flow guide 405 may be provided within the duct 402 a sufficient distance away from the catalyst 404 such that the flow guide 405 does not interfere with movement of the movable element 406 between the first and second positions. For example, the flow guide may be provided at a distance from a first end 402a of the duct, which is greater than a length of the movable element 406, e.g. a length of the movable element that is received within the duct 402 when the movable element 406 is in the second position.

The exhaust treatment assembly may further comprise an exhaust directing element 414 configured to guide exhaust gases that have passed the movable element towards the first portion 404a of the catalyst. The exhaust directing element 414 may be coupled to the catalyst 404. In some arrangements, the exhaust directing element 414 may be formed by the catalyst 404, e.g. a portion of the substrate of the catalyst may extend towards the duct 402 to form the exhaust directing element 414.

As depicted in FIG. 8, the exhaust directing element 414 may comprise a tube extending from the catalyst 404 towards the duct 402. The tube may be a cylindrical tube, a square tube, an octagonal tube or may be any other shape in cross-section. In some arrangements, the shape of the tube may be configured to surround a perimeter of the first portion of the catalyst. For example, the tube may be a cylindrical tube substantially the same diameter as the first portion 404a.

Additionally or alternatively, when the movable element 406 comprises a tubular movable element, the cross-sectional shape of exhaust directing element 414 may be similar to the cross-sectional shape of the movable element 406. Additionally, the exhaust directing element may be substantially the same size, e.g. define the same flow area, as the movable element 406, such that exhaust gases may flow smoothly from the movable element to the exhaust directing element 414, e.g. without a change in the flow area of the exhaust gases. In some arrangements, the exhaust directing element 414 may be configured such that the movable element 406 may be at least partially received within the exhaust directing element 414.

By providing the exhaust directing element 414, the distance moved by the movable element 406 between the first and second positions may be reduced, without compromising the ability of the movable element to direct exhaust gases towards the first portion 404a of the catalyst. Reducing the distance between the first and second positions may reduce the maximum distance between the movable element 406 and the flow guide 405, which may improve the ability of the flow guide to direct exhaust gases away from the gap 407.

The embodiment 400 comprises control mechanism 420 having a control rod 422 and a connector 426 coupled to the control rod 422. In some arrangements, the connector 426 may be coupled to a point 427 on the movable element located at or towards a central axis of the duct. When the control mechanism 420 applies a force to the movable element to move the moveable element between the first and second positions, the force may be applied at the point 427. A moment generated on the movable element by applying the force may therefore be reduced compared to arrangements in which the point 427 is provided away from the central axis of the duct 402. Reducing the moment applied to the movable element may reduce the likelihood of the movable element becoming wedged or stuck when moving between the first and second positions.

With reference to FIG. 9, an embodiment 500, according to another arrangement of the present disclosure, comprises a duct 502, diffuser 503 and a catalyst 504 that are similar to the ducts 202, 402, diffusers 203, 403 and catalysts 204, 404 described above.

The embodiment 500 further comprises a movable element 506, which is similar to the movable element 206, 406 except that the movable element comprises one or more bosses 507 extending from the movable element 506 in a radially outward direction. As depicted in FIG. 9, the bosses may extend outside, e.g. radially outside, a wall 502a of the duct, e.g. via openings 502b provided in the wall 502a of the duct.

The embodiment 500 further comprises one or more covers 505 coupled to the duct 502 configured to receive the bosses 507. The covers 505 may cover the openings 502b formed in the wall of the duct and may be sealed against the wall 502a of the duct to prevent exhaust gases from leaking out of the exhaust treatment assembly. The covers 505 and the openings 502b may extend along the duct 502 a length that is equal to or greater than the distance moved by the movable element 506 between the first and second positions such that the bosses 507 do not interfere with the wall 502a or the covers 505 when the movable element is moved between the first and second positions.

In the arrangement shown in FIG. 9, separate covers 505 are provided at each of the openings 502b. However, it is equally envisaged that the covers 505 may extend around the duct 502 and may cover more than one of the opening 502b. In some arrangements, a single cover 505 may be provided that extends around the circumference of the duct 502 and covers each of the openings 502b.

The embodiment 500 further comprises a control mechanism 520 comprising one or more actuators 510, which control the position of the movable element via respective control rods 522. Unlike in the arrangements shown in FIGS. 7A, 7B, and 4, control rods 522 may not be pivotally coupled to the duct 502 or diffuser 503, but may be configured to move linearly, e.g. along respective axes of the control rods 522, under the action of the actuator 510. The control rods 522 may extend from the actuators 510 into the covers 505 and may be coupled to the bosses 507 of the movable element. The movable element 506 is thereby moved between the first and second positons by forces applied at the bosses 507 of the movable element.

Gas seals 523 may be provided between the control rods 522 and the covers 505 to prevent exhaust gases from leaking out of the covers 505. Alternatively, in other arrangements of the disclosure, the actuators 510 and the control rods 522 may be provided within the covers 505, which may define sealed chambers.

As shown in FIG. 9, the embodiment 500 may comprise two actuators 510 provided at a top and bottom of the duct, e.g. vertically spaced about the duct. However, it is equally envisaged that the actuators 510 may be laterally spaced about the duct. In other arrangements, 1, 3, 4 or more actuators 510 may be spaced around the duct with any desired spacing, e.g. angular spacing, about a central axis of the duct 502. The number and arrangement of the covers 505 and actuators 510 may correspond to the number and arrangement of bosses 507 provided on the movable element 506.

Controlling the position of the movable element by providing force from an actuator at two or more positions around the movable element may cancel out moments or couples generated on the movable element due to the forces applied by the actuators 510. Hence, the likelihood of the movable element becoming wedged or stuck as is moves between the first and second positions may be reduced.

In the arrangement shown in FIGS. 7A-9, the actuators 210, 410, 510 are linear actuators configured to apply force in a linear direction. However, in other arrangements of the present disclosure, the actuator may be a rotary actuator.

With reference to FIG. 10, an exhaust treatment assembly 600, according to another arrangement of the present disclosure, comprises a control mechanism 620 including two rotary actuators 610 spaced about a duct 602. As shown, the actuators 610 may be configured to rotate respective pinon gears 622 that mesh with racks 623 provided on a movable element 606 of the exhaust treatments assembly 600 in order to move the movable element 606 between first and second positions.

As shown in FIG. 10, the exhaust treatment assembly 600 may comprise two rotary actuators 610 provided at a top and bottom of the duct, e.g. vertically spaced about the duct. However, it is equally envisage that the actuators 610 may be laterally spaced about the duct. In other arrangements, 1, 3, 4 or more actuators 610 may be spaced around the duct with any desired spacing, e.g. angular spacing, about a central axis of the duct 602. The number and arrangement of the rotary actuators 610 may correspond to the number and arrangement of the racks 623 provided on the movable element 606.

The rotary actuators 610 may be electrically driven. In other words, the rotary actuator may comprise an electric motor. The electric motor may comprise an encoder such that the rotation of the actuator may be accurately controlled. In some arrangements, the electric motor may be a stepper motor. Alternatively, the rotary actuator 610 may be a hydraulic or pneumatically powered actuator.

As depicted in FIG. 10, the rotary actuators 610 and the pinion gears 622 may be housed within covers 605 coupled to the duct 602 and/or diffuser 603. The covers 605 may create sealed housings for the rotary actuators and prevent exhaust gases leaking from the exhaust treatment assembly 600.

In the arrangement shown in FIG. 10, separate covers 605 are provided at each of the rotary actuators 610. However, it is equally envisaged that the covers 605 may extend around the duct 602 and may cover more than one of the rotary actuators 610. In some arrangements, a single cover 605 may be provided that extends around the circumference of the duct 602 and covers each of the rotary actuators.

In the arrangement shown, the pinion gears 622 are coupled, e.g. directly coupled, to the rotary actuators and rotated directly by the rotary actuators. However, in other arrangements, the pinon gears 622 may be driven by the rotary actuator by virtue of one or more gears (not shown) provided within the control mechanism 620.

Therefore in summary, current known measures to produce rapid catalyst temperature light-off have a number of disadvantages such as injecting more fuel will result in worse fuel economy and increased CO2 and other emissions, altering injection and/or spark timing will result in reduced fuel economy, increased exhaust CO2 and emissions, the use of additional precious metal loading of the catalyst brick to improve light-off performance will result in additional cost, and the use of electrical heating for the catalyst will result in added cost. Such disadvantages are not incurred if the disclosure as set out in the appended claims is used thereby reducing cost, fuel usage and increasing emission performance.

In this way, a flow control device comprising one or more vanes selectively adjusted in response to at least a temperature of an aftertreatment device may rapidly heat the aftertreatment device during at least a cold engine start. The technical effect of adjusting one or more vanes to a closed position is to direct a greater amount of exhaust gas toward an inner region of the aftertreatment device and less to an outer region of the aftertreatment device. This may allow a smaller portion of the aftertreatment device to contact exhaust gas, thereby reducing an amount of time needed to light-off the catalyst.

An embodiment of an emission control system comprises an electronic controller, an electrically controllable actuator operable in response to a control output from the electronic controller and a catalytic aftertreatment device connected to an exhaust outlet from an engine comprising a housing defining an inlet flow passage, an outlet flow passage, and a chamber in which is located a catalyst and a flow control device positioned upstream from the catalyst, the flow control device comprising inner and outer exhaust gas flow passages linking the inlet flow passage to the catalyst and a flow regulating means to selectively vary the flow of exhaust gas through the outer exhaust gas flow passage wherein the electrically controllable actuator is connected to the flow regulating means to limit the flow of exhaust gas flowing through the outer exhaust gas flow passage to speed up light-off of the catalytic aftertreatment device following a cold start up of the engine, wherein the flow regulating means comprises one or more vanes rotatable from a first position in which substantially no exhaust gas can flow through the outer exhaust gas flow passage to a second position in which there is substantially no restriction to the flow of exhaust gas through the outer exhaust gas flow passage, the vanes being spaced circumferentially around the outer gas flow passage.

A first example of the emission control system further comprises where each of the vanes is arranged to rotate about a respective pivot axis that extends radially outwardly from a longitudinal axis of the catalytic aftertreatment device, and each pivot axis is offset with a central axis of a corresponding vane. A second example of the emission control system, optionally including the first example, further includes where each of the vanes is linked together by a linkage mechanism so as to be moveable in unison between the first and second positions, and where the first position is achieved when the electrically controllable actuator is activated and where the second position is achieved when the electrically controllable actuator is deactivated. A third example of the emission control system, optionally including the first and/or second examples, further includes where the linkage mechanism has an input member for connecting the linkage mechanism to a common actuator. A fourth example of the emission control system, optionally including one or more of the first through third examples, further includes where the electronic controller is arranged to move the vanes to the first position when it is desired to speed up light-off of the catalytic aftertreatment device and move the vanes to the second position when light-off has occurred. A fifth example of the emission control system, optionally including one or more of the first through fourth examples, further includes where the electronic controller activates the actuator in response to a temperature of the catalytic aftertreatment device is less than a threshold temperature, and where the electronic controller deactivates the actuator in response to the temperature of the catalytic aftertreatment device being greater than the threshold temperature. A sixth example of the emission control system, optionally including one or more of the first through fifth examples, further includes where at least one exhaust gas temperature sensor and an exhaust gas emission sensor to provide an indication to the electronic controller when light-off has occurred. A seventh example of the emission control system, optionally including one or more of the first through sixth examples, further includes where the electrically controllable actuator is connected to the input member of the linkage mechanism.

An embodiment of a method comprising flowing exhaust gas through inner and outer exhaust flow passages of a flow control device toward an aftertreatment device when an aftertreatment device temperature is greater than or equal to a threshold temperature, where the exhaust gas forces vanes of the flow control device in the outer exhaust flow passage to an open position and blocking a portion of exhaust gas flow through the outer exhaust flow passage and increasing exhaust gas flow through the inner exhaust flow passage when the aftertreatment device temperature is less than the threshold temperature, where the vanes are adjusted to a closed position via an actuator. A first example of the method further includes where actuator is activated via instructions from a controller, the actuator being electrically, mechanically, hydraulically, and/or pneumatically powered. A second example of the method, optionally including the first example, further includes where the actuator is deactivated when the vanes are in or being actuated toward the open position. A third example of the method, optionally including the first and/or second examples, further includes where each vane of the vanes comprises a pivot axis, where the pivot axis of each vane is offset with a corresponding central axis of each vane, further comprising a first side and a second side defined by the pivot axis, where exhaust gas applies unequal pressures to the first and second sides. A fourth example of the method, optionally including one or more of the first through third examples, further includes where the threshold temperature corresponds to a light-off temperature of the aftertreatment device. A fifth example of the method, optionally including one or more of the first through fourth examples, further includes where the flow control device is directly upstream of the aftertreatment device. A sixth example of the method, optionally including one or more of the first through fifth examples, further includes where are impervious to exhaust gas flow.

An embodiment of a system comprises a flow control device arranged between an engine and an aftertreatment device, the flow control device comprising a tube separating an inner passage from an outer passage, further comprising a plurality of vanes circumferentially arranged in the outer passage around the can, where the vanes are configured to pivot and adjust exhaust flow through the outer passage based on a temperature of the aftertreatment device. A first example of the system further includes where the can extends directly from the aftertreatment device, and where the vanes extends from the can to a housing of the flow control device. A second example of the system, optionally including the first example, further includes where a controller with computer-readable instructions stored on memory thereon that when executed enable the controller to activate an actuator of the flow control device to actuate the vanes from an open position to a closed position in response to the temperature being less than a light-off temperature, where the open position allows exhaust gas to freely flow through the outer passage, and where the closed position blocks exhaust gas flow through the outer passage. A third example of the system, optionally including the first and/or second examples, further includes where the actuator is a single actuator corresponding to a single vane of the flow control device, and where each vane comprises a corresponding actuator, and where controller may selectively activate one or more of the actuators based on a difference between the temperature and the light-off temperature when the temperature is less than the light-off temperature. A fourth example of the system, optionally including one or more of the first through third examples, further includes a number of actuators activated increases in response to the difference increasing, and where vanes remain in the open position when their corresponding actuator is not activated.

It will be appreciated by those skilled in the art that although the disclosure has been described by way of example with reference to one or more embodiments it is not limited to the disclosed embodiments and that one or more modifications to the disclosed embodiments or alternative embodiments could be constructed without departing from the scope of the disclosure as set out in the appended claims.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An emission control system comprising:
an electronic controller, an electrically controllable actuator operable in response to a control output from the electronic controller and a catalytic aftertreatment device connected to an exhaust outlet from an engine comprising a housing defining an inlet flow passage, an outlet flow passage, and a chamber in which is located a catalyst and a flow control device positioned upstream from the catalyst, the flow control device comprising inner and outer exhaust gas flow passages linking the inlet flow passage to the catalyst and a flow regulating means to selectively vary flow of exhaust gas through the outer exhaust gas flow passage wherein the electrically controllable actuator is connected to the flow regulating means to limit the flow of exhaust gas flowing through the outer exhaust gas flow passage to speed up light-off of the catalytic aftertreatment device following a cold start up of the engine, wherein the flow regulating means comprises a plurality of vanes rotatable from a first position in which substantially no exhaust gas can flow through the outer exhaust gas flow passage to a second position in which there is substantially no restriction to the flow of exhaust gas through the outer exhaust gas flow passage, the plurality of vanes being spaced circumferentially around the outer gas flow passage on a tube, and wherein the outer exhaust gas flow passage is separated from the inner exhaust gas flow passage via the tube.

2. The emission control system of claim 1, wherein each vane of the plurality of vanes is arranged to rotate about a respective pivot axis that extends radially outwardly from a longitudinal axis of the catalytic aftertreatment device, and each pivot axis is offset with a central axis of a corresponding vane.

3. The emission control system of claim 1, wherein each of the plurality of vanes is linked together by a linkage mechanism and configured to be moveable in unison between the first and second positions, and where the first position is achieved when the electrically controllable actuator is activated and where the second position is achieved when the electrically controllable actuator is deactivated.

4. The emission control system of claim 3, wherein the linkage mechanism has an input member for connecting the linkage mechanism to a common actuator.

5. The emission control system of claim 4, wherein the electronic controller is arranged to move the plurality of vanes to the first position when it is desired to speed up light-off of the catalytic aftertreatment device and move the vanes to the second position when light-off has occurred.

6. The emission control system of claim 4, wherein the electronic controller activates the electrically controllable actuator in response to a temperature of the catalytic aftertreatment device is less than a threshold temperature, and where the electronic controller deactivates the electrically controllable actuator in response to the temperature of the catalytic aftertreatment device being greater than the threshold temperature.

7. The emission control system of claim 1, further comprising at least one exhaust gas temperature sensor and an exhaust gas emission sensor to provide an indication to the electronic controller when light-off has occurred.

8. The emission control system of claim 4, wherein the electrically controllable actuator is connected to the input member of the linkage mechanism.

9. A method comprising:
flowing exhaust gas through inner and outer exhaust flow passages of a flow control device separated via a tube toward an aftertreatment device when an aftertreatment device temperature is greater than or equal to a threshold temperature, where the exhaust gas forces a plurality of vanes circumferentially arranged in the outer exhaust flow passage on a the tube of the flow control device to an open position; and
blocking at least a portion of exhaust gas flow through the outer exhaust flow passage and increasing exhaust gas flow through the inner exhaust flow passage when the aftertreatment device temperature is less than the threshold temperature, where the plurality of vanes is adjusted to a closed position via an actuator.

10. The method of claim 9, wherein the actuator is activated via instructions from a controller, the actuator being electrically, mechanically, hydraulically, and/or pneumatically powered.

11. The method of claim 9, wherein the actuator is deactivated when the plurality of vanes is in or being actuated toward the open position.

12. The method of claim 9, wherein each vane of the plurality of vanes comprises a pivot axis, where the pivot axis of each vane is offset with a corresponding central axis of each vane, wherein each vane comprises a first side and a second side defined by the pivot axis, where exhaust gas applies unequal pressures to the first and second sides.

13. The method of claim 9, wherein the threshold temperature corresponds to a light-off temperature of the aftertreatment device.

14. The method of claim 9, wherein the flow control device is directly upstream of the aftertreatment device.

15. The method of claim 9, wherein the plurality of vanes is impervious to exhaust gas flow.

16. A system comprising:
a flow control device arranged between an engine and an aftertreatment device, the flow control device comprising a tube separating an inner passage from an outer passage, wherein a plurality of vanes is circumferentially arranged in the outer passage around the tube, where the vanes are configured to pivot and adjust exhaust flow through the outer passage based on a temperature of the aftertreatment device and
wherein the tube is upstream of the aftertreatment device and defines a central portion of the aftertreatment device, wherein the aftertreatment device further includes an outer portion radially outside the central portion and radially outside the tube.

17. The system of claim 16, wherein the can extends directly from the aftertreatment device, and where the plurality of vanes extends from the can to a housing of the flow control device.

18. The system of claim 16, further comprising a controller with computer-readable instructions stored on memory thereon that when executed enable the controller to activate an actuator of the flow control device to actuate the plurality of vanes from an open position to a closed position in response to the temperature being less than a light-off temperature, where the open position allows exhaust gas to freely flow through the outer passage, and where the closed position blocks exhaust gas flow through the outer passage.

19. The system of claim 18, wherein the actuator is a single actuator corresponding to a single vane of the flow control device, and where each vane of the plurality of vanes comprises a corresponding actuator, and where the controller may selectively activate one or more of the actuators based on a difference between the temperature and the light-off temperature when the temperature is less than the light-off temperature.

20. The system of claim 19, wherein a number of actuators activated increases in response to the difference increasing, and where the plurality of vanes remains in the open position when the corresponding actuators are not activated.

* * * * *